June 28, 1927.
H. H. DULEY
DETECTORMETER
Filed Sept. 28, 1925
1,633,930
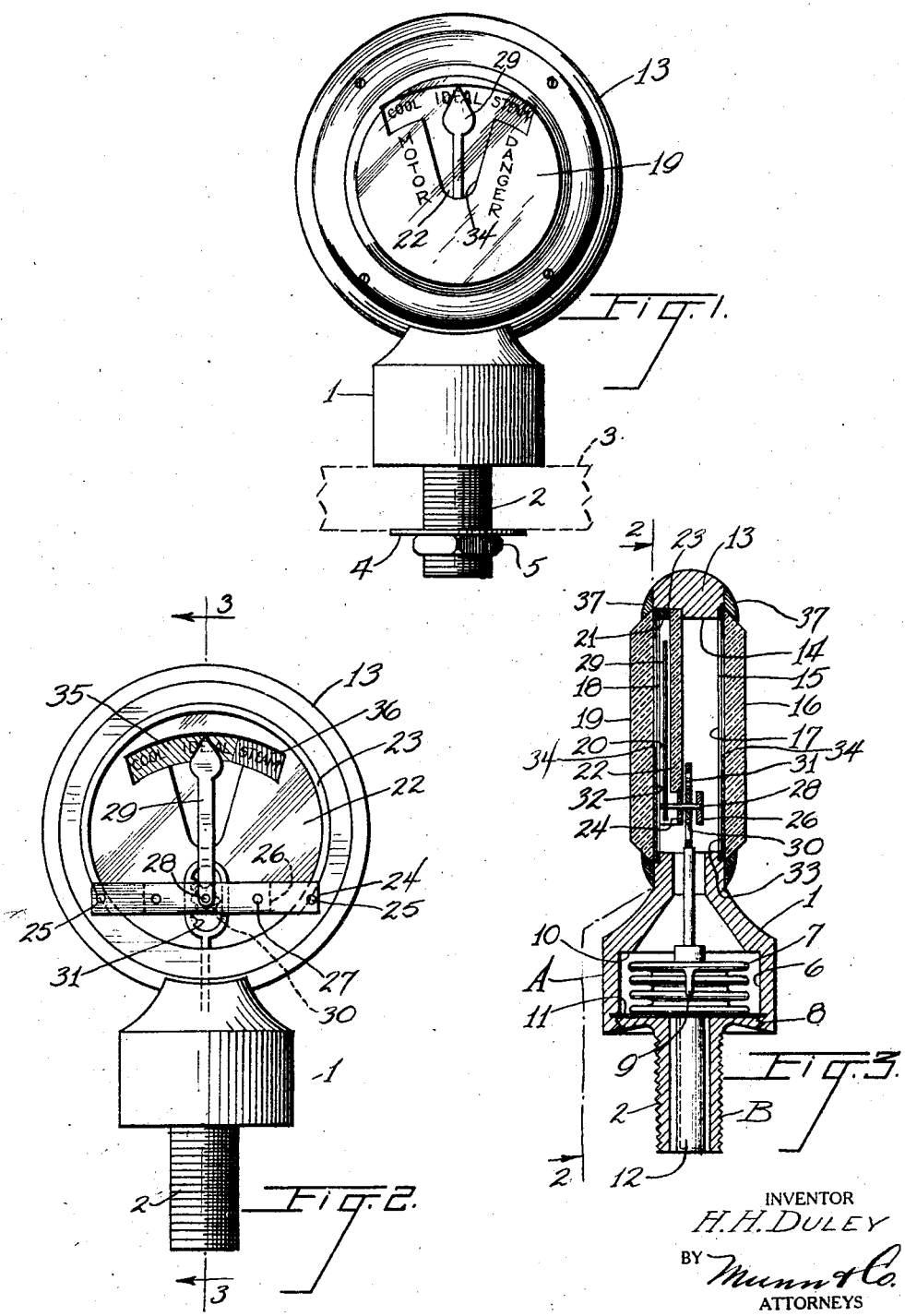
INVENTOR
H. H. DULEY
BY Munn & Co.
ATTORNEYS Patented June 28, 1927.

1,633,930

UNITED STATES PATENT OFFICE.

HARLEY H. DULEY, OF CHICAGO, ILLINOIS.

DETECTORMETER.

Application filed September 28, 1925. Serial No. 59,218.

My invention relates to improvements in detectormeters, and it consists in the combinations, constructions, and arrangements herein described and claimed.

An object of my invention is to provide a detectormeter employing novel means for accurately indicating the temperature of the water within the radiator of the automobile, this means making use of a movable hand, a dial having words printed thereon for indicating the condition of the water, the dial being colored in a predetermined manner to aid the driver in reading at a glance what the temperature of the water is.

A further object of my invention is to provide a device of the type described which makes use of a novel thermostatic member for moving the indicator hand, the device further being provided with means for limiting the expansion and contraction of the thermostatic member, thus preventing the thermostatic member from being over expanded or contracted.

A further object of my invention is to provide a device of the type described which is extremely simple in construction, which is durable and efficient for the purpose intended, and which is not likely to get out of order easily.

Other objects and advantages will appear in the following specification, and the novel features of the invention will be particularly pointed out in the appended claim.

My invention is illustrated in the accompanying drawings, forming part of this application, in which Figure 1 is a front elevation of the device, showing the face of the device that is viewed by the driver when in his seat in the vehicle, Figure 2 is a section along the line 2—2 of Figure 3, and Figure 3 is a section along the line 3—3 of Figure 2.

In carrying out my invention I provide a casing 1 that has a threaded depending tubular member 2. This member is adapted to be inserted in a radiator cap 3 and is secured in place by means of a washer 4 and a nut 5. The casing 1 has a compartment 6 therein in which a thermostatic element 7 is disposed.

I have found that the thermostatic element best suited for this purpose is called the sylphon diaphragm and is made by the Fulton Co. This thermostatic element is very sensitive to slight changes in temperature and moreover will return to its normal position after being expanded or contracted. In this way the indicator hand will accurately show the temperature of the water during the entire life of the device. The casing is divided into two parts A and B, which are threaded together at 8 after the thermostatic element 7 has been disposed in the compartment 6.

The element 7 is provided with a stop member 9 for limiting the contraction of the element, and the casing is provided with a shoulder 10 for limiting the expansion of the element. The element is held in place by means of a disc 11 to which the element is soldered, the disc in turn being received between the parts A and B, as shown in Figure 3. The element has a depending portion 12 that extends downwardly in the hollow stem 2. The depending portion 12 is spaced from the inner wall of the tube 2 to permit the heat to gain access around the exterior surface of the depending portion 12.

The casing 1 has a circular portion 13 with an opening 14 extending therethrough. This opening has an annular groove 15 for receiving a glass 16 and a gasket 17. The opposite side of the ring 13 is provided with a groove 18, a glass 19 and a gasket 20, similar to the parts just described. The ring 13 is provided with another recess 21 for receiving a dial 22 and a spacing washer 23. The under edge of the dial 22 is carried by means of a strip 24, the strip in turn being secured to the ring 13 by means of screws or other like fastening means 25. A second strip 26, smaller in length than the first strip 24, is disposed parallel with the strip 24 and has its ends secured to the strip 24 by means of screws 27. These two strips provide a supporting means for a shaft 28. The shaft carries an indicator hand 29 and a pinion 30.

The pinion 30 is operatively connected to the thermostatic element 7 by means of a rack 31. The mechanism is entirely covered by means of two opaque discs 32 and 33. These discs are disposed adjacent to the glasses 16 and 19 and are provided with openings 34 of the shape shown in Figure 1. The openings 34 are large enough to permit the indicator hand to be viewed in its various positions.

The dial 22 has an area 35 thereof colored green and another area 36 thereof colored red. These areas 35 and 36 are cross-hatched to indicate the colors green and red, respectively. In addition to the colors, I provide the words "Cool" and "Ideal" in the area 35 and the word "Steam" in the area 36. The glasses 16 and 19 are secured to the ring 13 by means of retaining rings 37.

From the foregoing description of the various parts of the device, the operation thereof may be readily understood. The device is secured in position on the radiator cap so as to turn the glass 19 toward the driver's seat. The thermostatic element 7 is corrugated and is filled with a liquid that is subject to expansion and contraction due to slight changes in temperature, this liquid being alcohol or other like sensitive fluids. The device is now ready for use and the thermostatic element 7 will expand and contract due to changes in temperature of the water and will actuate the indicator hand 29. The coloring on the dial 22, together with the words, quickly informs the driver of the condition of the water in the radiator. In fact, the coloring can be seen at a greater distance than can the printing, and further the hand 29 can be seen at a greater distance than can the red mercury in standard motormeters now provided with cars.

I claim:

A device of the type described comprising a casing, a transparent dial having colored portions thereon disposed in said casing, a thermostatic member carried by said casing, a vertically disposed rack carried by said thermostatic member and provided with a guide and stop portions, strips horizontally disposed in said casing, a shaft rotatably disposed in said strips, a pinion disposed between said rack, said guide and said stop portions and rigidly mounted upon said shaft, an indicator arm disposed upon said shaft and rigidly secured to said pinion, the free end of said indicator arm being adapted to communicate with the colored portions of said dial, said casing being fashioned to limit the expansion of said thermostatic member, means carried by said thermostatic member for limiting the contraction of said member, a transparent glass disposed upon each side of said casing, an opaque disc having an opening therein in alignment with said indicator arm and said colored portions and disposed adjacent each of said transparent glasses whereby said indicator arm and said colored portions may be readily viewed from either side of said casing.

HARLEY H. DULEY.